(No Model.)

C. E. BURLINGAME.
PHOTOGRAPHIC CAMERA.

No. 403,574. Patented May 21, 1889.

Witnesses.
Howard F. Eaton
Fred. S. Greenleaf

Inventor:
Charles E. Burlingame.
by Crosby & Gregory
attys

N. PETERS, Photo-Lithographer, Washington, D. C.

UNITED STATES PATENT OFFICE.

CHARLES E. BURLINGAME, OF BOSTON, MASSACHUSETTS.

PHOTOGRAPHIC CAMERA.

SPECIFICATION forming part of Letters Patent No. 403,574, dated May 21, 1889.

Application filed April 30, 1888. Serial No. 272,349. (No model.)

*To all whom it may concern:*

Be it known that I, CHARLES E. BURLINGAME, of Boston, county of Suffolk, State of Massachusetts, have invented an Improvement in Photographic Cameras, of which the following description, in connection with the accompanying drawings, is a specification, like letters on the drawings representing like parts.

This invention relates to photographic apparatus of that class known as "detective-cameras," and has for its object to improve the construction of the same, whereby the object to be photographed may be instantaneously taken when in the focus of the lens.

In accordance with my invention I employ a stationary lens, preferably adjustable in one side of the camera, a sensitive plate, and a dark chamber interposed between the said sensitive plate and lens, the said chamber having an opening substantially in line with the lens, normally closed by a mirror, which constitutes the shutter for the said opening.

The top or cover of the camera is provided with a tell-tale plate, preferably red ground glass, or it may be any other non-actinic plate, upon which the object to be photographed is reflected by the mirror referred to, so that when the object is in the focus of the lens, which is made known to the operator by the image upon the tell-tale plate, the mirror may be substantially instantaneously removed, to uncover the opening in the dark chamber and permit the rays of light from the lens to strike upon the sensitive plate, the said opening being again closed substantially in an instant, to effect a substantially instantaneous exposure of the sensitive plate to the rays of light. The mirror may have a reciprocating or a rotary or other motion to uncover the opening, the said motions being effected, as herein shown, by means of a coiled spring.

My improved camera is especially adapted to photograph moving objects.

My invention therefore consists, essentially, in a camera, a box, a cover therefor, provided with a tell-tale plate, a sensitive surface and a lens, and a dark chamber interposed between said sensitive surface and lens, and provided with an opening substantially in line with the lens, combined with a mirror normally covering said opening, a disk attached thereto, and with means to move the said disk, a stop on said disk, and a locking device to engage said stop and operated from outside the box, as and for the purpose to be described.

Other features of my invention will be pointed out in the claims at the end of this specification.

Figure 1:
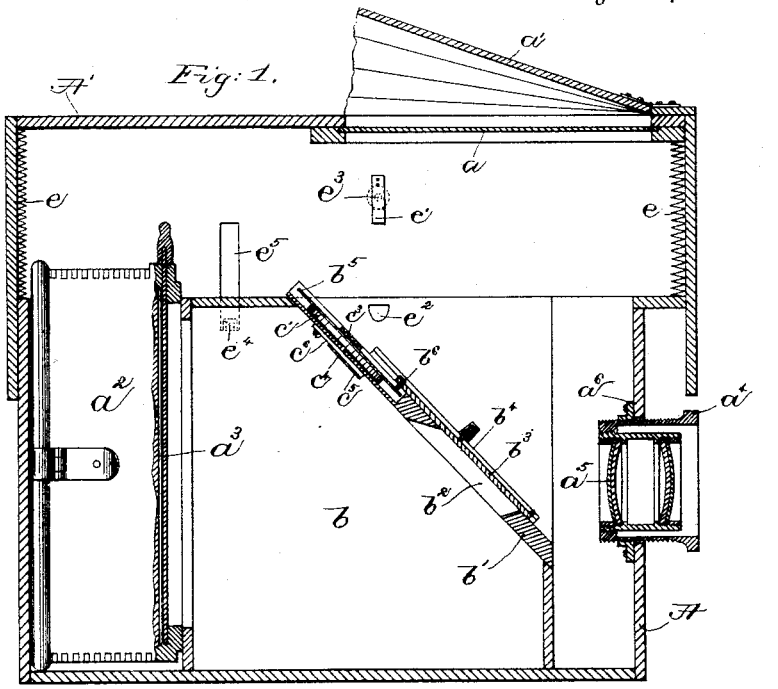
Figure 2:
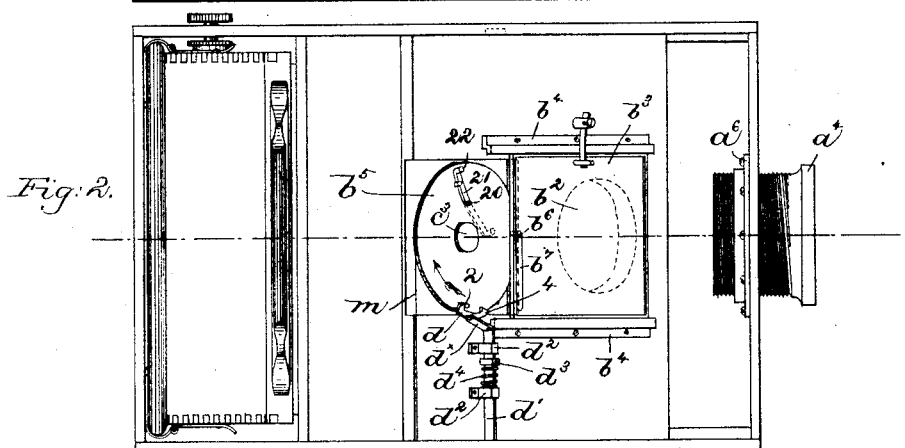
Figure 3:
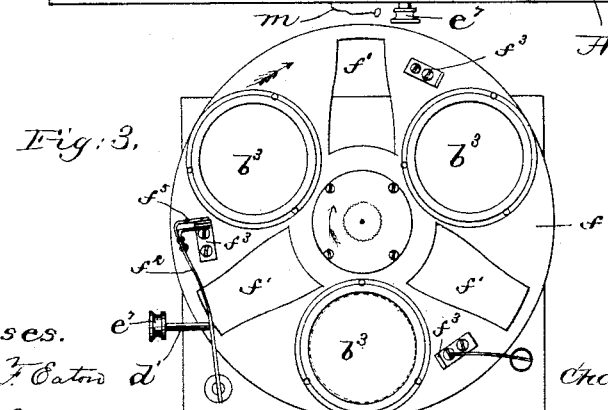

Figure 1 is a vertical longitudinal section of a camera embodying my invention. Fig. 2 is a top view of the camera shown in Fig. 1, with the cover removed; and Fig. 3, a modification to be referred to.

The box or case A, the cover A', provided with the tell-tale plate $a$, protected by the movable flap or cover $a'$, herein shown as hinged to the top cover, $a$, may be of usual construction common to this class of apparatus. The box A contains, as shown, a photographic film-holder, $a^2$, which may be substantially such as known as the "Eastman" holder, shown and described in United States Patent No. 316,933, dated May 5, 1885, and a sensitive plate or surface, $a^3$, of ordinary construction, and the side of the box opposite the said sensitive plate is provided with a suitable opening through which is inserted a threaded sleeve, $a^4$, carrying a lens, $a^5$, the said threaded sleeve being inserted through and engaging the threads of a collar, $a^6$, secured to the side of the box. The box A between the sensitive plate and lens contains a dark chamber, $b$, having one of its sides or walls $b'$, as herein shown, inclined to about forty-five degrees. The side or wall $b'$, substantially in line with the lens, is provided with an opening, $b^2$, preferably round, as indicated by dotted lines, Fig. 2.

The opening $b^2$, as shown in Figs. 1 and 2, is normally closed by a mirror, $b^3$, having its frame movable in guides $b^4$, secured to the wall $b'$, the said mirror-frame being reciprocated, as herein shown, to uncover and again cover the opening $b^2$, substantially in an instant, by a spring-actuated disk or support, $b^5$, having a stud or projection, $b^6$, extended into a slot, $b^7$, in the mirror-frame.

The disk $b^5$ is mounted on an arbor extended through the wall $b'$, and having secured to it, as shown, one end of a coiled spring, $c'$, secured at its other end to the disk $b^5$, the said arbor being turned to wind the spring by a thumb-nut, $c^3$, on the said arbor, the said spring, when wound, being so retained by a ratchet, $c^4$, pawl $c^5$, and spring $c^6$ acting on said ratchet in usual or well-known manner.

The mirror-frame is normally retained over the opening in the wall by a locking device, herein shown as an escapement-lever, $d$, pivoted to a link, $d^\times$, connected to a rod or bar, $d'$, extended through suitable guide, $d^2$, and through the side of the box.

The rod $d'$, as shown, is provided with a collar, $d^3$, between which and the guide $d^2$ is a coiled spring, $d^4$, which acts to move the rod outward into its normal position.

The cover of the box is herein shown as supported upon springs $e$, which may be compressed to compact the camera when not in use, the cover being locked in compacted position by any suitable catch, the latter being herein shown as a spring, $e'$, secured to the inner side of the cover and provided with a suitable hook or projection to engage a recess or notch, $e^2$, in the side of the box A, the said spring being disengaged from the notch $e^2$, as shown, by a push-rod, $e^3$, indicated by dotted lines, Fig. 1, extended through the side of the cover.

When the apparatus is to be used, the spring-catch $e'$ is disengaged from the notch $e^2$ and the cover raised into the position shown in Fig. 1, the distance from the plate $a$ to the mirror being substantially equal to the distance from the mirror to the sensitive plate, the upward movement of the cover being limited when the said distances are equal in any suitable manner, as by a stud, $e^4$, on the box extended into a groove, $e^5$, in the cover.

One tooth, as 2, of the escapement-lever $d$, is normally in engagement with a stud or pin, 3, on the disk $b^5$.

With the apparatus in the position shown in Fig. 1 the camera is ready to be used. When the object to be photographed has been brought into the focus of the lens, as indicated on the tell-tale plate, and which may be accomplished by moving the camera bodily or by adjusting the sleeve $a^4$ in the threaded collar $a^6$, the operator pushes the button or head $e^7$ on the rod $d'$ to disengage the tooth 2 of the lever $d$ from the stud 3 on the disk $b^5$, whereupon the coiled spring $c'$ revolves the said disk, thereby reciprocating the mirror to uncover the opening by means of the stud $b^6$ and slot $b^7$, whereby the opening is uncovered for substantially an instant, permitting the rays of light from the lens to act on the sensitive plate but a short time, thus obtaining a substantially instantaneous exposure of the sensitive plate.

Instead of a reciprocating mirror to uncover the opening in the dark chamber, I may employ a rotary disk, $f$, (see Fig. 3,) having, as shown, three mirrors, $b^3$, with openings $f'$ between the said mirrors, so that when the locking device (shown as a spring, $f^2$) is disengaged from the stud or projection $f^3$ on the disk by pushing on the bottom $e^7$ on the rod $d'$, fast to the spring $f^2$, the said disk is moved a third of a revolution, as shown—that is, until a second stop, $f^3$, is engaged by the locking device—the opening in the dark chamber being uncovered as the opening $f'$ in the disk is moved by or over it, thus exposing the sensitive plate but an instant, the stud $f^3$ passing through an opening or slot (not shown) in the arm $f^5$ of the spring $f^2$.

I have herein shown a well-known form of film-holder and sensitive plate; but I do not desire to limit my invention to any particular form of sensitive surface, as any usual or well-known form may be used; and so, also, I do not desire to limit my invention to the use of a coiled spring to move the mirror-shutter, as other means—such as a weight or other form of spring—may be used.

If the spring were permitted to run down or nearly so before being wound, it would become gradually weakened, and as a result each succeeding exposure would be somewhat longer than the preceding one, thereby giving rise to unequal exposures, which might prevent the picture being successfully taken, especially when the object is moving. To obviate this and insure the same length of exposure, I have provided means by which the rotating disk may be turned in the direction opposite to its rotation by the spring to wind up the spring after each exposure, the lens at such time being covered by a suitable cap of ordinary construction and not herein shown.

The means referred to by which the spring is rewound after each exposure is herein shown as a cord, $m$, secured to the disk and passed out through a suitable opening in the side of the box, as shown in Fig. 2.

I have herein described my improved apparatus as adapted for instantaneous photography; but, if desired, it may be employed in the ordinary manner to obtain an exposure of any desired length of time. To accomplish this result, the disk $b^5$ has pivoted upon it, as at 20, a swinging arm, 21, having a stud, 22, the said arm, when an instantaneous exposure is desired, being in its dotted-line position, Fig. 2; but when a time exposure is desired the said arm is turned into its full-line position, the stud 22 being then in the path of movement of the lever, and will be engaged by the tooth 2 thereof, thus holding the mirror away from the opening. When the sensitive surface has been exposed the desired and required time, the button $e^7$ may be pushed upon to release the lever $d$ from the stud 22, the said lever being again engaged by the stud 2, the disk having completed a revolution, thus again covering the opening.

I claim—

1. In a camera, a box, a cover therefor provided with a tell-tale, a sensitive surface, a lens, and a dark chamber interposed between said sensitive surface and lens and provided with an opening substantially in line with the said lens, combined with a mirror, a disk or support attached thereto, means to move said disk, a stop on said disk, and a locking device to engage said stop and operated from outside the box, substantially as described.

2. In a camera, a box, a cover therefor provided with a tell-tale, a sensitive surface, a lens, and a dark chamber interposed between said sensitive surface and lens and provided with an opening substantially in line with the said lens, combined with a mirror, a disk or support attached thereto, means to move said disk, a stop on said disk, a locking device to engage said stop and operated from outside the box, and a movable stop adapted to be moved into position to be engaged by the locking device, as and for the purpose specified.

In testimony whereof I have signed my name to this specification in the presence of two subscribing witnesses.

CHARLES E. BURLINGAME.

Witnesses:
JAS. H. CHURCHILL,
B. DEWAR.